(12) United States Patent
Taylor, III (10) Patent No.: US 7,324,973 B2
(45) Date of Patent: Jan. 29, 2008

(54) GAMING SYSTEM AND METHOD OF SECURELY TRANSFERRING A MONETARY VALUE

(75) Inventor: John R Taylor, III, Keswick, VA (US)

(73) Assignee: Video Gaming Technologies, Inc., Roebuck, SC (US)

( * ) Notice: Subject to any disclaimer, the term of this patent is extended or adjusted under 35 U.S.C. 154(b) by 281 days.

(21) Appl. No.: 11/079,943

(22) Filed: Mar. 15, 2005

(65) Prior Publication Data

US 2005/0234834 A1    Oct. 20, 2005

Related U.S. Application Data

(60) Provisional application No. 60/563,169, filed on Apr. 16, 2004.

(51) Int. Cl.
*G06Q 99/00*    (2006.01)

(52) U.S. Cl. .............................. 705/50; 705/51; 705/67; 705/77

(58) Field of Classification Search ................. 705/50, 705/51, 67, 77
See application file for complete search history.

(56) References Cited

U.S. PATENT DOCUMENTS

| | | | |
|---|---|---|---|
| 5,265,874 A | 11/1993 | Dickinson et al. |
| 5,267,314 A | 11/1993 | Stambler |
| 5,524,073 A | 6/1996 | Stambler |
| 5,555,303 A | 9/1996 | Stambler |
| 5,621,797 A | 4/1997 | Rosen |
| 5,674,128 A | 10/1997 | Holch et al. |
| 5,754,654 A | 5/1998 | Hiroya et al. |
| 5,800,269 A | 9/1998 | Holch et al. |
| 5,919,091 A | 7/1999 | Bell et al. |
| 5,936,541 A | 8/1999 | Stambler |
| 5,974,148 A | 10/1999 | Stambler |
| 6,048,269 A | 4/2000 | Burns et al. |
| 6,089,982 A | 7/2000 | Holch et al. |
| 6,116,402 A | 9/2000 | Beach et al. |
| 6,233,565 B1 | 5/2001 | Lewis et al. |
| 6,280,326 B1 | 8/2001 | Saunders |

(Continued)

FOREIGN PATENT DOCUMENTS

JP         411306420 A   *  11/1999

(Continued)

*Primary Examiner*—Pierre Eddy Elisca
(74) *Attorney, Agent, or Firm*—Howard & Howard Attorneys, P.C.

(57) ABSTRACT

A cashless gaming system and method of securely transferring a monetary value. When "cashing-out" of a first terminal of the system, the monetary value is encrypted with an encryption key and an encryption algorithm to produce an encrypted monetary value. A transaction code is associated with encryption key and the monetary value. The transaction code and encrypted monetary value are written to a transportable medium that is issued by the first terminal. The transaction code and associated encryption key are stored in a key repository database. The transaction code and monetary value are stored in an accounting database which is securely separate from the key repository database. The transportable medium is taken to a second terminal where the encrypted monetary value and transaction code are read. The encryption key associated with the transaction code is retrieved and used to decrypt the encrypted monetary value. The monetary value is then credited to the second terminal.

46 Claims, 4 Drawing Sheets

U.S. PATENT DOCUMENTS

| | | |
|---|---|---|
| 6,280,328 B1 | 8/2001 | Holch et al. |
| 6,394,907 B1 | 5/2002 | Rowe |
| 6,471,590 B2 | 10/2002 | Saunders |
| 6,500,067 B1 | 12/2002 | Luciano et al. |
| 6,511,377 B1 | 1/2003 | Weiss |
| 6,536,663 B1 | 3/2003 | Lozier et al. |
| 6,547,664 B2 | 4/2003 | Saunders |
| 6,558,256 B1 | 5/2003 | Saunders |
| 6,565,434 B1 | 5/2003 | Acres |
| 6,598,788 B1 | 7/2003 | Dabrowski |
| 6,607,441 B1 | 8/2003 | Acres |
| 6,623,357 B2 | 9/2003 | Chowdhury |
| 6,629,591 B1 | 10/2003 | Griswold et al. |
| 6,652,380 B1 | 11/2003 | Luciano |
| 6,675,152 B1 | 1/2004 | Prasad et al. |
| 6,676,515 B1 | 1/2004 | Baltz et al. |
| 6,676,522 B2 | 1/2004 | Rowe et al. |
| 6,679,775 B1 | 1/2004 | Luciano et al. |
| 6,712,697 B2 | 3/2004 | Acres |
| 6,729,957 B2 | 5/2004 | Burns et al. |
| 6,729,958 B2 | 5/2004 | Burns et al. |
| 6,736,725 B2 | 5/2004 | Burns et al. |
| 6,746,330 B2 | 6/2004 | Cannon |
| 2002/0077178 A1 | 6/2002 | Oberberger et al. |
| 2003/0022718 A1 | 1/2003 | Salerno |
| 2003/0083127 A1* | 5/2003 | Weiss .......................... 463/25 |
| 2003/0087692 A1* | 5/2003 | Weiss .......................... 463/25 |
| 2003/0106769 A1* | 6/2003 | Weiss .......................... 194/201 |
| 2003/0228907 A1 | 12/2003 | Gatto et al. |
| 2004/0111619 A1 | 6/2004 | Laurie et al. |
| 2005/0090308 A1* | 4/2005 | Weiss .......................... 463/25 |

FOREIGN PATENT DOCUMENTS

WO     WO 98/59311 A1     12/1998

* cited by examiner

GAMING SYSTEM AND METHOD OF SECURELY TRANSFERRING A MONETARY VALUE

CROSS REFERENCE TO RELATED APPLICATION

This application claims priority to U.S. Provisional Application Ser. No. 60/563,169, filed Apr. 16, 2004, which is hereby incorporated by reference.

FIELD OF THE INVENTION

The subject invention relates to a cashless gaming system and a method of securely transferring a monetary value in the cashless gaming system.

BACKGROUND OF THE INVENTION

Electronic or video gaming machines in casinos, such as slot machines or electronic bingo games, typically have accepted coins to be wagered. These coins have typically been dispensed as winnings. This left a player of the machine to carry a large quantity of coins to a cashier for conversion into paper bills or other such convenient form. Furthermore, if the machine did not have sufficient coins in its hopper to pay the player, long waits typically occurred while an attendant filled the hopper with more coins. As a result, the casino industry has been moving toward cashless gaming systems where the player receives a voucher in lieu of coins when "cashing out" of a gaming machine. One such cashless gaming system is disclosed in U.S. Pat. No. 6,746,330 to Cannon (the '330 patent).

The '330 patent discloses a cashless gaming system and method of transferring a monetary value in the cashless gaming system. The cashless gaming system includes a plurality of gaming machines and a plurality of change machines. The cashless gaming system also includes a central processing system in communication with the gaming machines and change machines. The central processing system includes a processor and memory. When a player elects to "cash-out" of one of the gaming machines, the monetary value of the gaming machine is transferred to the memory of the central processing system. A memory address corresponding to the monetary value is then encrypted and printed as a bar code on a ticket. The ticket is issued from the gaming machine to the player. The player can then take the ticket to another gaming machine or a change machine. When inserted in the other gaming machine or the change machine, the bar code is read and the memory address is decrypted. The central processing system then transfers the monetary value associated with the memory address to the machine.

Although the '330 patent provides an adequate system and method for transferring a monetary value, the system and method remain vulnerable to security breaches. For example, if an unauthorized person were to access the central processing system, it may be possible to change the monetary value corresponding to a particular memory address. This may allow the unauthorized user to increase the amount received when the ticket is redeemed.

The present invention is aimed at the problem identified above.

SUMMARY OF THE INVENTION

In one aspect of the present invention, a method of securely transferring a monetary value in a cashless gaming system is provided. The method includes the steps of establishing the monetary value in a first terminal, receiving a request for transfer of the monetary value established in the first terminal, generating a unique encryption key for use with an encryption algorithm, encrypting the monetary value using the encryption key with the encryption algorithm to produce an encrypted monetary value, and forming an encrypted message including the encrypted monetary value. The method further includes the steps of associating a transaction code with the encryption key and the monetary value, debiting the monetary value from the first terminal, recording the transaction code and the monetary value in an accounting database in response to the debiting of the monetary value from the first terminal, storing the encryption key and the transaction code in a key repository database securely separate from the accounting database, and writing the transaction code and the encrypted message to a transportable medium.

In another aspect of the present invention, a cashless gaming system for securely transferring a monetary value is provided. The system includes a first terminal for generating a unique encryption key for use with an encryption algorithm, encrypting the monetary value using the encryption key with the encryption algorithm to produce an encrypted monetary value, forming an encrypted message including the encrypted monetary value, associating a transaction code with the encryption key and the monetary value, debiting the monetary value, writing the transaction code and the encrypted message to a transportable medium, and issuing the transportable medium to the player. The system also includes an accounting server in operative communication with the first terminal and having an accounting database for recording the transaction code and the monetary value. A key repository server is in operative communication with the first terminal and includes a key repository database separate from the accounting database for storing the encryption key and the transaction code.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Referring to the Figures, wherein like numerals indicate like parts throughout the several views a gaming system 10 and method 100 of securely transferring a monetary value are shown.

Figure 1:
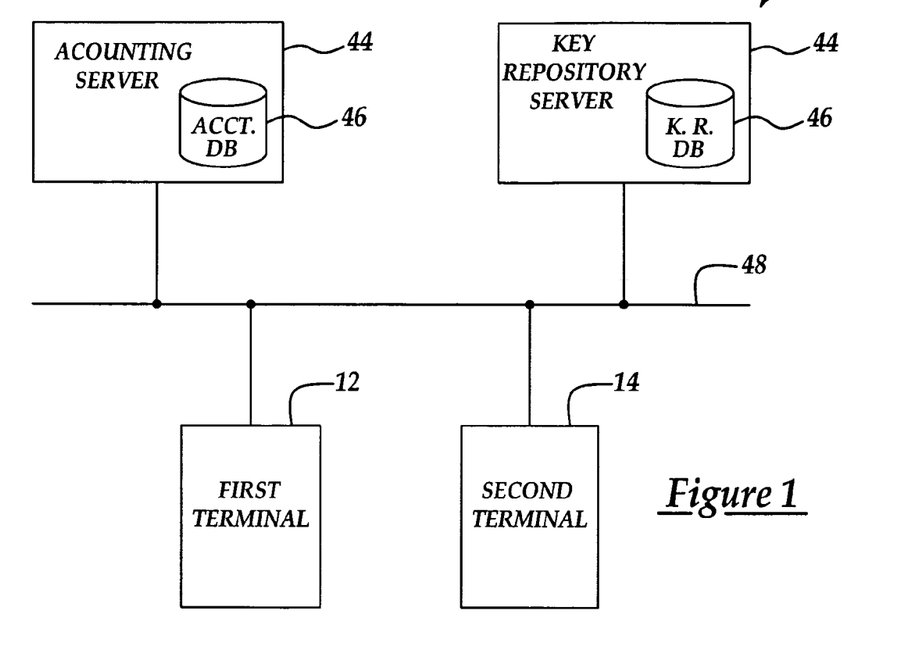
FIG. 1 is a block diagram showing a cashless gaming system.
Figure 2:
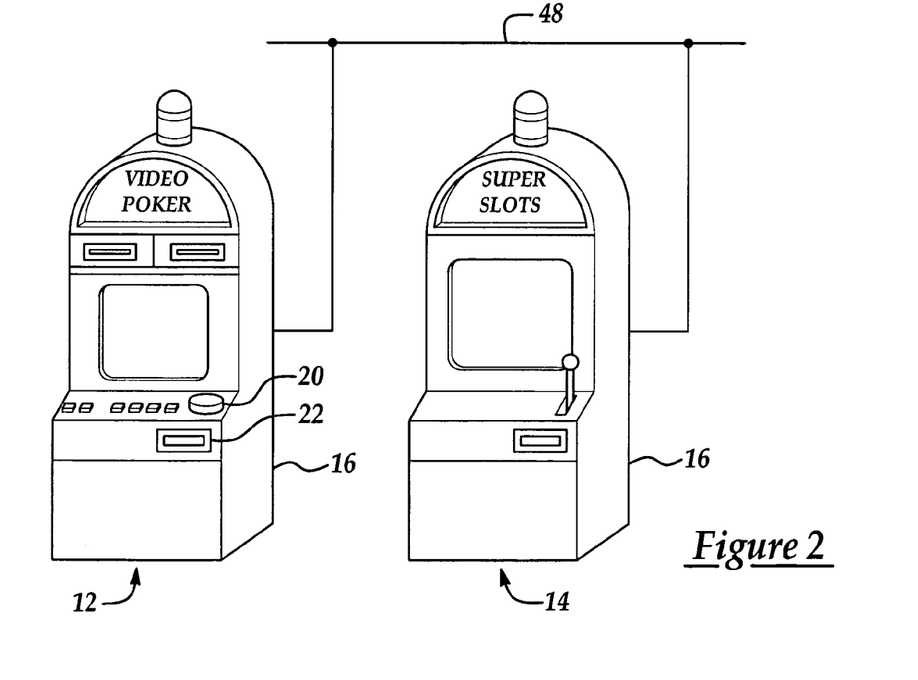
FIG. 2 is block diagram showing a first terminal and a second terminal of a first embodiment.
Figure 3:
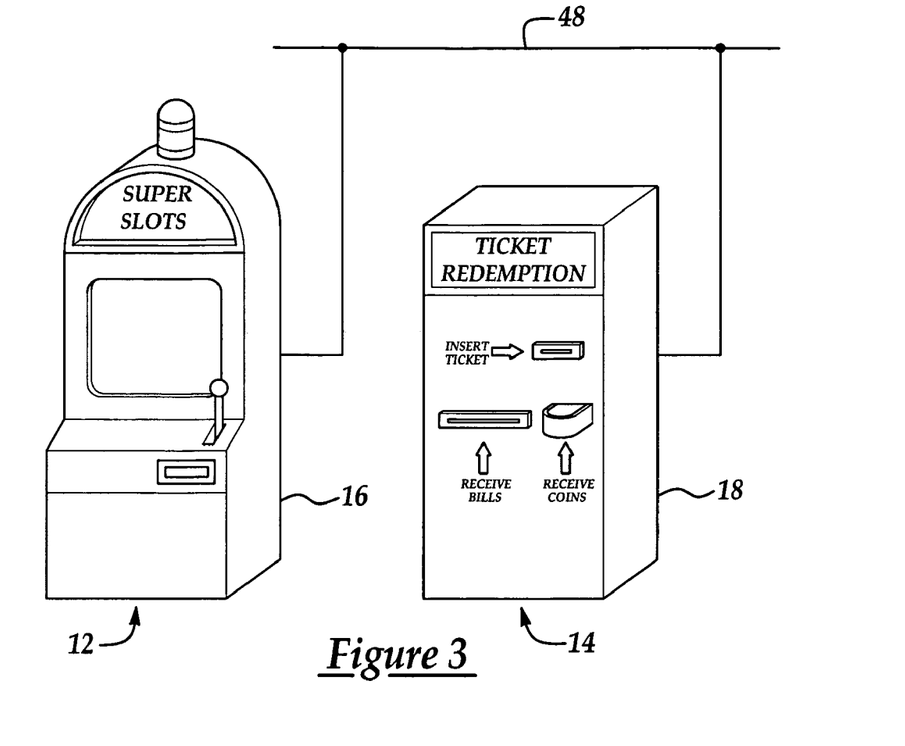
FIG. 3 is a block diagram showing the first terminal and the second terminal of a second embodiment.

The gaming system 10 of the present invention operates to allow a cashless transfer of a monetary value. Referring to FIG. 1, the system 10 includes a first terminal 12 and a second terminal 14. The cashless transfer of the monetary value occurs between the first terminal 12 and the second terminal 14. In a first embodiment, as shown in FIG. 2, the first 12 and second terminals 14 are further defined as electronic gaming machines (EGMs) 16, such as video slot machines, video poker machines, or video bingo machines, playable by the player. EGMs 16 are well known to those skilled in the art and are often implemented with mechanical reels, video reels, or video card games, such as video poker. In a second embodiment, as shown in FIG. 3, the first terminal 12 is an EGM 16 and the second terminal 14 is further defined as a validation station 18. The validation station 18 provides the player cash in an amount equal to the monetary value being transferred. The validation station 18 may be an automated machine or operated by a cashier. Of course, those skilled in the art also realize other suitable implementations of the first 12 and second terminals 14

Figure 4A:
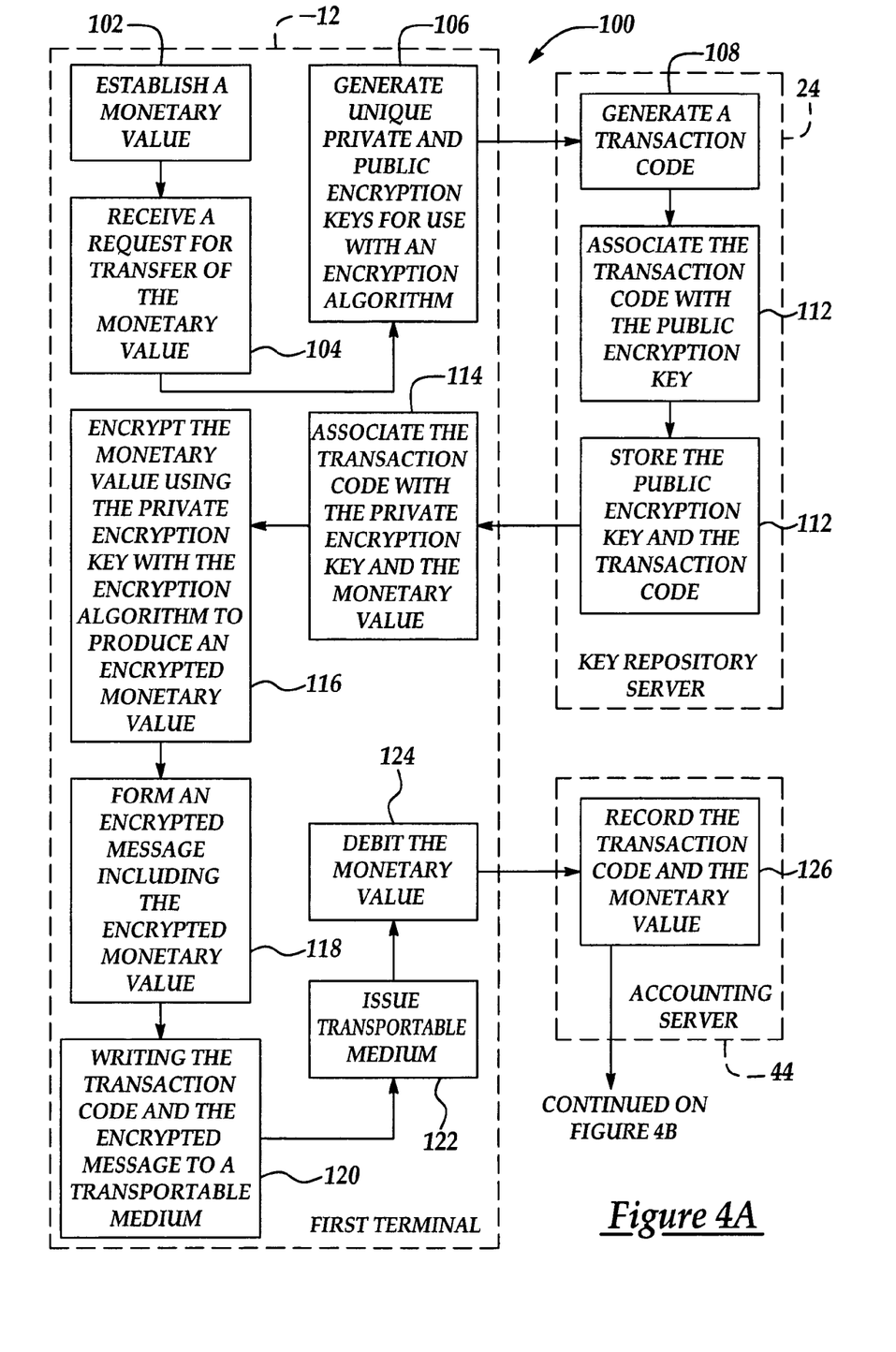
FIG. 4A is a first portion of a schematic diagram detailing the steps of a method of securely transferring a monetary value in the cashless gaming system.

Referring to FIG. 4A, the method 100 begins by establishing 102 a monetary value in the first terminal 12. In the first embodiment, the monetary value is typically established by depositing currency into the first terminal 12 implemented as an EGM 16. This can be accomplished by depositing coins into a coin slot 20 or paper bills in a bill validator 22 of the EGM 16 or by sliding a credit or debit card through a card reader (not shown). The bill validator 22 is also commonly referred to as a bill reader. Other techniques for establishing a monetary value in the first terminal 12 are known to those skilled in the art.

The method 100 continues with the step of receiving 104 a request for transfer of the monetary value established in the first terminal 12. In the first embodiment, when the player is done playing the EGM 16, they player will elect to "cash out". This is typically accomplished by depressing a physical or "virtual" button on the EGM 16.

Once the request to transfer the monetary value is received, the method 100 continues by generating 106 a unique encryption key for use with an encryption algorithm. In the first embodiment, the unique encryption key is generated within the first terminal 12. However, it is understood that the unique encryption key could be generated elsewhere in the gaming system 10, such as a remote computer. Also in the first embodiment, the encryption key is further defined as a public encryption key and a private encryption key. The public and private encryption keys are related to one another as is well known to those skilled in the art. Typically, the private encryption key is used to encrypt data while the public encryption key is used to decrypt data.

Referring again to FIG. 1, the system 10 also includes a key repository server 24. They key repository server 24 is in operative communication with the first terminal 12 and the second terminal 14. The key repository server 24 includes a key repository database 26 for storing encryption keys and associated information. In the first embodiment, the first terminal 12 sends the public encryption key to the key repository server 24. The key repository server 24 examines the public encryption key and ensures that the public encryption key is not already used and stored in the key repository database 26. If the public encryption key is already used, the key repository server 24 requests that the first terminal 12 generate a new public encryption key (and necessarily, a new private encryption key) and send the new public encryption key to the key repository server 24. Once a valid (i.e. not previously used) public encryption key is received by the key repository server 24, the method continues by the key repository server 24 generating 108 a transaction code 28 and associating 110 the transaction code 28 with the public encryption key. The transaction code 28 is typically a unique, sequential number to uniquely identify the transaction.

The method 100 continues with the step of storing 112 the encryption key and the transaction code 28 in the key repository server 24. In the first embodiment, this is more specifically accomplished by storing the public encryption key and the transaction code 28 in the key repository database 26 of the key repository server 24.

The transaction code 28 is sent from the key repository server 24 to the first terminal 12. The method 100 progresses by associating 114 the transaction code 28 with the encryption key and the monetary value in the first terminal 12. In the first embodiment, this is specifically accomplished by associating 114 the transaction code 28 with the private encryption key and the monetary value.

The method 100 then continues with the step of encrypting 116 the monetary value using the encryption key with the encryption algorithm. As a result, the encryption algorithm produces an encrypted monetary value 30. In the first embodiment, the monetary value is encrypted in the first terminal 12 by using the private encryption key and the encryption algorithm. The first terminal 12 also encrypts the transaction code 28 and a machine identification (MID) code. The MID code is a unique number for uniquely identifying the first terminal 12 from other terminals that are part of the system 10. The encrypting of the transaction code 28 and the MID code generates, respectively, an encrypted transaction code 32 and an encrypted MID code 34.

The method 100 continues further by forming 118 an encrypted message 38. The encrypted message 38 includes the encrypted monetary value 30. In the first embodiment, the encrypted message 38 also includes the encrypted transaction code 32 and the encrypted MID code 34.

Figure 5:
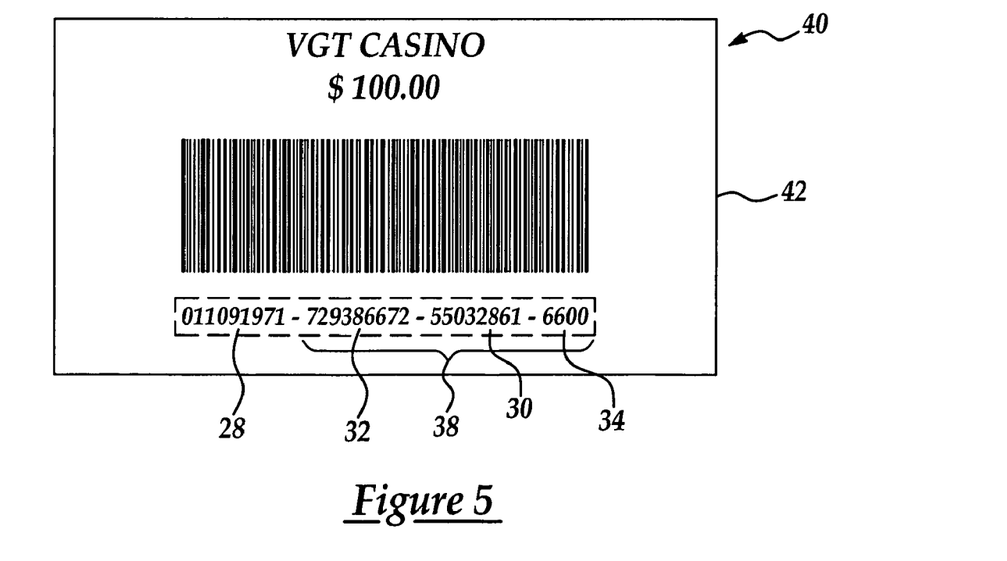
FIG. 5 is a graphic representation of a ticket produced by the first terminal of the first embodiment.

The method 100 continues with the step of writing 120 the transaction code 28 and the encrypted message 38 to a transportable medium 40. In the first embodiment, the first terminal 12 includes a printer. The transportable medium 40 is further defined as a ticket 42. The ticket 42 is printed on paper by the printer. Referring to FIG. 5, the transaction code 28 and the encrypted message 38 are printed on the ticket 42. The ticket 42 includes a bar code 36 for representing the transaction code 28 and the encrypted message 38. The ticket 42 may include other information, such as a name of the casino where the system 10 is implemented, the monetary value shown in non-encrypted form, and the time and date of the transaction. Of course, in other embodiments, the transportable medium 40 may be implemented using other media. In one example, the transportable medium 40 could be a card with a magnetic stripe for storing the transaction code 28 and the encrypted message 38. In another example, the transportable medium 40 could include a microchip having a memory for storing the transaction code 28 and the encrypted message 38. The method 100 continues with the step of issuing 122 the transportable medium 40 to the player.

In response to the step of writing 120 the transaction code 28 and the encrypted message 38 to the transportable medium 40, the method 100 progresses by debiting 124 the monetary value from the first terminal 12. Essentially, the monetary value that was established on the first terminal 12 is transferred to the transportable medium 40.

The system 10 also includes an accounting server 44. The accounting server 44 includes an accounting database 46 for recording monetary transfer transactions taking place on the system 10. Maintaining the accounting database 46 is critical for casino management being able to know the monetary value owed to various players holding transportable medium 40. In response to the debiting of the monetary value from the first terminal 12, the method 100 continues with the step of recording 126 the transaction code 28 and the monetary value in the accounting server 44. This evidences the debiting of the monetary value from the first terminal 12, thus essentially creating an account payable.

For purposes of security, the key repository database 26 is securely separate from the accounting database 46. This separation lessens the likelihood that the monetary value encoded on the transportable medium 40 could be changed or altered. For example, an unauthorized person would have to make an unauthorized alteration of the encryption key associated with a transaction code 28 in the key repository database 26. Then, the unauthorized person would have to change (or create anew) the transportable medium 40 such that the encoded message 38 is encoded with the altered encryption key. Further, the unauthorized user would have to also modify the accounting database 46 on the accounting server 44 such that the monetary value associated with the transaction code 28 is changed to match the changed transportable medium.

Figure 4B:
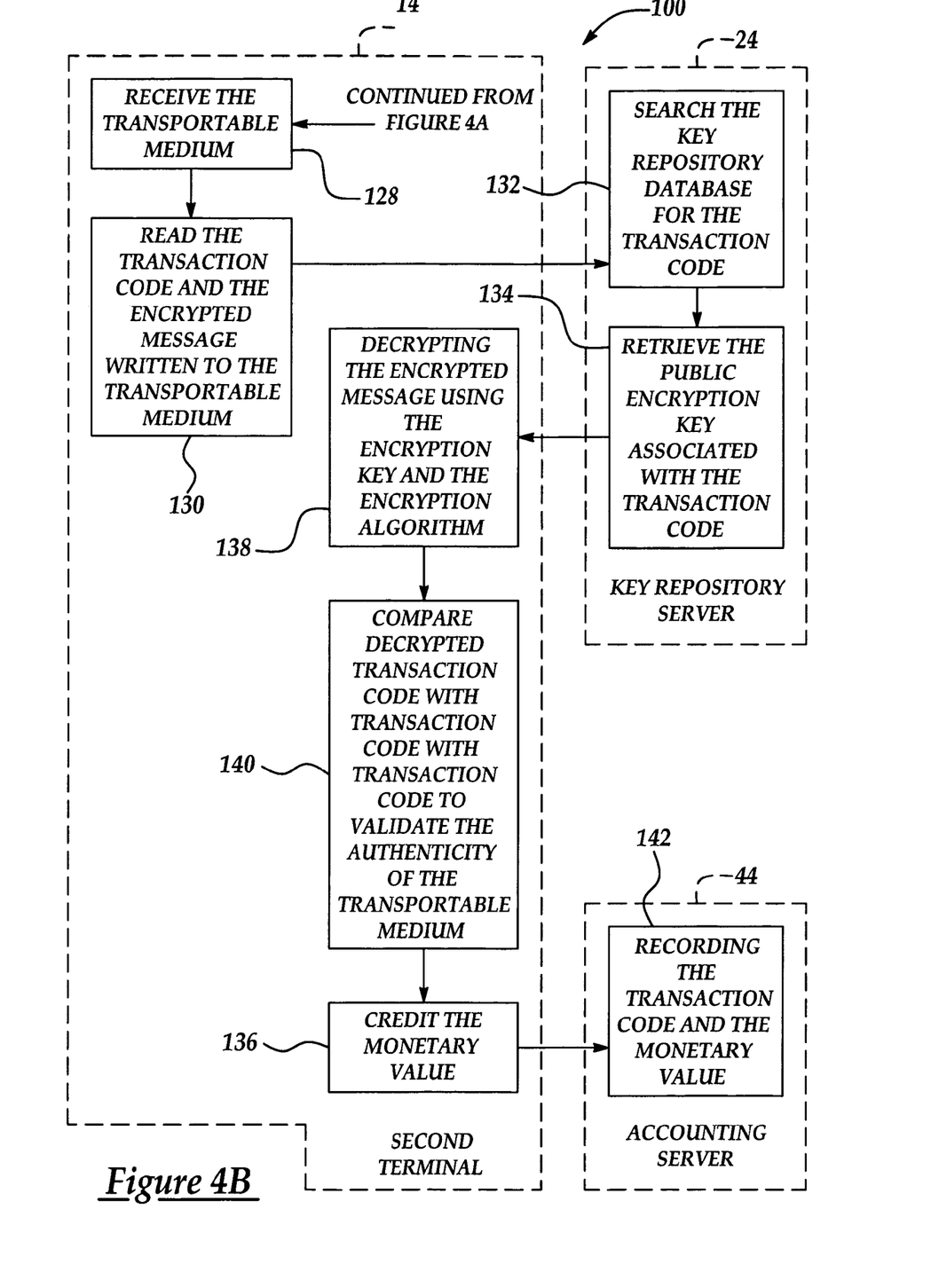
FIG. 4B is a second portion of the schematic diagram detailing the steps of the method of securely transferring the monetary value in the cashless gaming system.

Referring now to FIG. 4B, the method 100 continues with the step of receiving 128 the transportable medium 40 at the second terminal 14. The second terminal 14 includes a media inlet for receiving the transportable medium 40 from the player. In the first embodiment, where the second terminal 14 is implemented as the EGM 16, the media inlet may be embodied as the bill validator 22. Therefore, the ticket 42 is simply inserted into the bill validator 22, just as paper currency would be. The method 100 progresses with the step of reading 130 the transaction code 28 and the encrypted message 38 written to the transportable medium 40. The second terminal 14 typically includes an optical scanning device (not shown) for reading the bar code 36. As stated above, the bar code 36 represents the transaction code 28 and the encrypted message 38.

The transaction code 28 is sent from the second terminal 14 to the key repository server 24. The method continues with the key repository server 24 searching 132 the key repository database 26 for the transaction code 28. Once located, the method progresses by retrieving 134 the encryption key associated with the transaction code 28 from the key repository database 26. In the first embodiment, the public encryption key is searched for and retrieved from the key repository database 26. The retrieved encryption key is sent from the key repository server 24 to the second terminal 14.

In response to the encryption key being received by the second terminal 14, the method 100 progresses with the step of decrypting 136 the encrypted message 38 using the encryption key and the encryption algorithm. In the first embodiment, before decrypting, the encrypted message 38 is parsed into the encrypted monetary value 30, the encrypted transaction code 32, and the encrypted MID code 34 (of the first terminal 12). Then, as a result of the decrypting, the encrypted message 38 is decoded to provide the monetary value, a decrypted transaction code 28, and the MID code (of the first terminal 12). The decrypted transaction code 28 is then compared 138 to the transaction code 28 previously read from the transportable medium 40. This comparison provides one way to validate the authenticity of the transportable medium 40.

The method 100 continues by crediting 140 the monetary value in the second terminal 14. In the first embodiment, where the second terminal 14 is implemented as the ECM, the player is now able to play the machine with the monetary value, just as if cash had been inserted. In the second embodiment, where the second terminal 14 is implemented as the validation station 18, cash is dispensed to the player in the amount of the monetary value.

In response to the crediting of the monetary value at the second terminal 14, the method 100 continues further with the step of recording 142 the transaction code 28 and the monetary value in the accounting database 46 of the accounting server 44. This recording in the accounting database 46 will evidence the crediting of the monetary value at the second terminal 14. The accounting server 44 may then compare the earlier record debiting the corresponding monetary value. If the credited and debited monetary values do not match, the system 10 may take a corrective action. For example, the system 10 may debit the monetary value from the second terminal 14 and notify casino security.

In the first embodiment, a network 48 is electrically connected to the first terminal 12, the second terminal 14, the accounting server 44, and the key repository server 24. The network 48 provides communications between the first 12 and second terminals 14 and the accounting server 44. The network 48 also provides communications between the first 12 and second terminals 14 and the key repository server 24. Those skilled in the art realize that the network 48 may be implemented as a hard-wired network 48, such as Ethernet, or as a wireless network 48, such as a network using 802.11 protocols. Of course, the network 48 may be implemented using numerous other techniques, as known to those skilled in the art.

The above-detailed actions of the terminals 12, 14, databases 26, 46, and servers 24, 44, are virtually transparent to the player. In one scenario, the player would approach a first EGM. The player may insert a $20 bill into the bill validator 22 of the first EGM. Twenty dollars worth of credits are then available on the machine. The player may then play the game or games provided by the first EGM. After a playing awhile the player has accumulated winnings and the credit on the machine is now worth $50. The player may want to try his luck on a different machine and presses the "cashout" button on the first EGM. The credits on the machine are removed and a ticket 42 is printed by the first EGM and issued to the player. The ticket 42 may include the name of the casino, the monetary value ($50), a series of numbers or characters, and a bar code which represents the series of numbers or characters. The player then approaches a second EGM and inserts the ticket 42 into the bill validator 22. The second EGM processes the ticket 42, as described above, and credits the machine for $50. After playing the second EGM, the player has won again and the machine is credited with $100. The player then elects to cash out of the second EGM. The second EGM prints and issues a new ticket 42. The player may then take the ticket 42 to a validation station 18. The player inserts the ticket 42 into an appropriate slot on the validation station 18. The validation station 18 reads the bar code, processes the information, and dispenses $100 in currency to the player.

Obviously, many modifications and variations of the present invention are possible in light of the above teachings. The invention may be practiced otherwise than as specifically described within the scope of the appended claims.

What is claimed is:

1. A method of securely transferring a monetary value in a cashless gaming system comprising the steps of:
    establishing the monetary value in a first terminal;
    receiving a request for transfer of the monetary value established in the first terminal;
    generating a unique encryption key for use with an encryption algorithm;
    encrypting the monetary value using the encryption key with the encryption algorithm to produce an encrypted monetary value;
    forming an encrypted message including the encrypted monetary value;
    associating a transaction code with the encryption key and the monetary value;
    debiting the monetary value from the first terminal;
    recording the transaction code and the monetary value in an accounting database in response to the debiting of the monetary value from the first terminal;
    storing the encryption key and the transaction code in a key repository database securely separate from the accounting database; and
    writing the transaction code and the encrypted message to a transportable medium.

2. A method as set forth in claim 1 further comprising the step of issuing the transportable medium to a player.

3. A method as set forth in claim 1 further comprising the steps of receiving the transportable medium at a second terminal and reading the transaction code and the encrypted message written to the transportable medium.

4. A method as set forth in claim 3 further comprising the step of sending the transaction code from the second terminal to the key repository database.

5. A method as set forth in claim 4 further comprising the step of sending the encryption key associated with the transaction code from the key repository database to the second terminal.

6. A method as set forth in claim 5 further comprising the step of decrypting the encrypted monetary value of the encrypted message using the encryption key and the encryption algorithm in the second terminal to determine the monetary value.

7. A method as set forth in claim 6 further comprising the step of crediting the monetary value in the second terminal.

8. A method as set forth in claim 7 further comprising the step of recording the transaction code and the monetary value in the accounting database in response to the crediting of the monetary value at the second terminal.

9. A method as set forth in claim 6 further comprising the step of encrypting the transaction code in the first terminal to create an encrypted transaction code.

10. A method as set forth in claim 9 wherein the encrypted message further includes the encrypted transaction code and further comprising the steps of decrypting the encrypted transaction code in the second terminal to produce a decrypted transaction code.

11. A method as set forth in claim 10 further comprising the step of comparing the decrypted transaction code to the transaction code to validate the authenticity of the transportable medium.

12. A method as set forth in claim 1 wherein the step of writing the transaction code and the encrypted message on a transportable medium is further defined as printing a bar code representing the transaction code and the encrypted message on a ticket.

13. A method as set forth in claim 1 wherein the encryption key is further defined as a public encryption key and a private encryption key related to one another and the step of encrypting the monetary value using the encryption key is further defined as encrypting the monetary value using the private encryption key with the encryption algorithm to create the encrypted monetary value.

14. A method as set forth in claim 13 wherein the step of storing the encryption key and the transaction code in a key repository server is further defined as storing the public encryption key and the transaction code in a key repository server.

15. A method as set forth in claim 14 further comprising the steps of receiving the transportable medium at a second terminal and reading the transaction code and the encrypted message written to the transportable medium.

16. A method as set forth in claim 15 further comprising the step of sending the transaction code from the second terminal to the key repository server.

17. A method as set forth in claim 16 further comprising the step of sending the public encryption key associated with the transaction code from the key repository server to the second terminal.

18. A method as set forth in claim 17 further comprising the step of decrypting the encrypted monetary value of the encrypted message using the public encryption key and the encryption algorithm in the second terminal to determine the monetary value.

19. A method as set forth in claim 18 further comprising the step of crediting the monetary value in the second terminal.

20. A method as set forth in claim 19 further comprising the step of recording the transaction code and the monetary value in the accounting server in response to the crediting of the monetary value at the second terminal to evidence the crediting of the monetary value at the second terminal.

21. A cashless gaming system for securely transferring a monetary value, said system comprising:
    a first terminal for generating a unique encryption key for use with an encryption algorithm, encrypting the monetary value using said encryption key with said encryption algorithm to produce an encrypted monetary value, forming an encrypted message including said encrypted monetary value, associating a transaction code with said encryption key and said monetary value, debiting the monetary value, writing said transaction code and said encrypted message to a transportable medium, and issuing the transportable medium to the player;
    an accounting server in operative communication with said first terminal and having an accounting database for recording the transaction code and the monetary value; and
    a key repository server in operative communication with said first terminal and having a key repository database separate from said accounting databse for storing said encryption key and said transaction code.

22. A system as set forth in claim 21 further comprising a second terminal in operative communication with said accounting server and said key repository server for receiving said transportable medium, reading said transaction code and said encrypted message written to said transportable medium, sending said transaction code to said key repository database, receiving said encryption key associated with said transaction code from said key repository database, decrypting said encrypted monetary value of said encrypted message using said encryption key and said encryption algorithm to determine the monetary value, crediting the monetary value, and sending said transaction code and the monetary value to said accounting database.

23. A system as set forth in claim 22 further comprising a network electrically connected to said first terminal, said second terminal, said accounting server, and said key repository server for providing communications between said first and second terminals and said accounting server and between said first and second terminals and said key repository server.

24. A system as set forth in claim 23 wherein said second terminal is further defined an electronic gaming machine playable by the player.

25. A system as set forth in claim 22 wherein said first terminal is further defined as an electronic gaming machine playable by the player.

26. A system as set forth in claim 25 wherein said second terminal is further defined as a validation station for providing the player cash in an amount equal to the monetary value stored on the transportable medium.

27. A system as set forth in claim 21 wherein said transportable medium is further defined as a ticket having a bar code for representing said transaction code and said encrypted message.

28. A system as set forth in claim 27 wherein said first terminal includes a printer for printing said ticket and issuing said ticket to the player.

29. A method of securely transferring a monetary value in a cashless gaming system comprising the steps of: establishing the monetary value in a first electronic gaming machine playable by a player;
receiving a request for transfer of the monetary value established in the first electronic gaming machine;
encrypting the monetary value using an encryption key with an encryption algorithm to produce an encrypted monetary value;
forming an encrypted message including the encrypted monetary value;
associating a transaction code with the encryption key and the monetary value;
debiting the monetary value from the first terminal;
storing the encryption key and the transaction code in a key repository database; and
writing the transaction code and the encrypted message to a transportable medium.

30. A method as set forth in claim 29 further comprising the step of issuing the transportable medium to the player.

31. A method as set forth in claim 29 further comprising the steps of receiving the transportable medium at a second electronic gaming machine and reading the transaction code and the encrypted message written to the transportable medium.

32. A method as set forth in claim 31 further comprising the step of sending the transaction code from the second electronic gaming machine to the key repository database.

33. A method as set forth in claim 32 further comprising the step of sending the encryption key associated with the transaction code from the key repository database to the second electronic gaming machine.

34. A method as set forth in claim 33 further comprising the step of decrypting the encrypted monetary value of the encrypted message using the encryption key and the encryption algorithm in the second electronic gaming machine to determine the monetary value.

35. A method as set forth in claim 34 further comprising the step of crediting the monetary value in the second electronic gaming machine.

36. A method as set forth in claim 34 further comprising the step of encrypting the transaction code in the first electronic gaming machine to create an encrypted transaction code.

37. A method as set forth in claim 36 wherein the encrypted message further includes the encrypted transaction code and further comprising the steps of decrypting the encrypted transaction code in the second electronic gaming machine to produce a decrypted transaction code.

38. A method as set forth in claim 37 further comprising the step of comparing the decrypted transaction code to the transaction code to validate the authenticity of the transportable medium.

39. A method as set forth in claim 29 wherein the step of writing the transaction code and the encrypted message on a transportable medium is further defined as printing a bar code representing the transaction code and the encrypted message on a ticket.

40. A method as set forth in claim 29 wherein the encryption key is further defined as a public encryption key and a private encryption key related to one another and the step of encrypting the monetary value using the encryption key is further defined as encrypting the monetary value using the private encryption key with the encryption algorithm to create the encrypted monetary value.

41. A method as set forth in claim 40 wherein the step of storing the encryption key and the transaction code in a key repository server is further defined as storing the public encryption key and the transaction code in a key repository server.

42. A method as set forth in claim 41 further comprising the steps of receiving the transportable medium at a second electronic gaming machine and reading the transaction code and the encrypted message written to the transportable medium.

43. A method as set forth in claim 42 further comprising the step of sending the transaction code from the second electronic gaming machine to the key repository server.

44. A method as set forth in claim 43 further comprising the step of sending the public encryption key associated with the transaction code from the key repository server to the second electronic gaming machine.

45. A method as set forth in claim 44 further comprising the step of decrypting the encrypted monetary value of the encrypted message using the public encryption key and the encryption algorithm in the second terminal to determine the monetary value.

46. A method as set forth in claim 45 further comprising the step of crediting the monetary value in the second electronic gaming machine.

* * * * *

UNITED STATES PATENT AND TRADEMARK OFFICE
CERTIFICATE OF CORRECTION

PATENT NO.         : 7,324,973 B2  
APPLICATION NO. : 11/079943  
DATED                  : January 29, 2008  
INVENTOR(S)        : John R. Taylor, III It is certified that error appears in the above-identified patent and that said Letters Patent is hereby corrected as shown below:

Column 8, line 59, Claim 21, DELETE "databse" and replace with --database--.

Signed and Sealed this

Twenty-first Day of October, 2008

JON W. DUDAS  
*Director of the United States Patent and Trademark Office*